May 22, 1934.  A. C. HEYSER  1,959,360
CLAMP NAIL
Filed Aug. 5, 1932
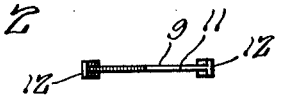
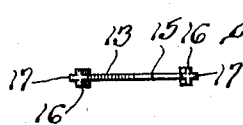
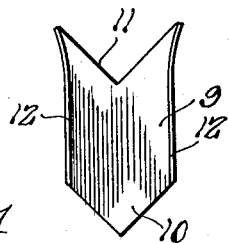
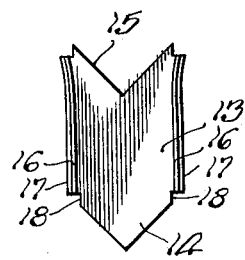
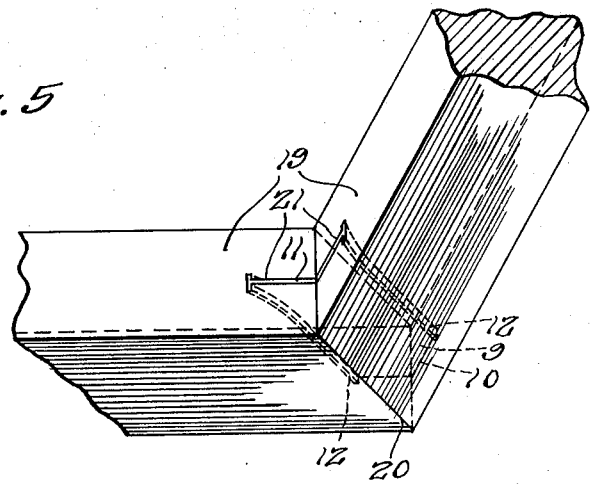
Inventor:
Arthur Chris Heyser
By Henry B. Floyd
Att'y.

Patented May 22, 1934

1,959,360

UNITED STATES PATENT OFFICE 1,959,360

CLAMP NAIL

Arthur Chris Heyser, Chicago, Ill., assignor to Clamp Nail Company, Chicago, Ill., a corporation of Illinois Application August 5, 1932, Serial No. 627,554

6 Claims. (Cl. 20—92)

This invention has to do with a nail adapted to be commonly driven into objects for the interfabrication thereof and relates particularly to an improved form of nail for a corner construction.

It is an object of the present invention to provide a new form of clamp nail having a tongue and a groove in opposite ends for fitting into the outer and inner sides of a corner construction respectively.

Another object of the present invention is the provision of a nail adapted to be commonly driven into pieces forming a corner construction and which entirely fills a saw kerf into which it is driven, thereby obviating the need for a filler before a paint or other finishing material is applied to the pieces.

Still another object of the present invention is the provision of a clamp nail with flanges flared in a fashion to draw pieces of a corner construction together concurrently with driving said nail thereinto from the outer side of such corner construction.

With the above and other desirable objects in view the invention is hereinafter set forth with reference to the single sheet of drawing hereby made a part of this specification and in which:

Figure 1 is a plan view of a nail embodying one form of the invention;

Figure 2 is an end view of the nail shown in Figure 1;

Figure 3 is a plan view of a different form of nail;

Figure 4 is an end view of the nail shown in Figure 3; and

Figure 5 is a view of a corner construction embodying a nail of the present invention and shown in angular perspective.

The same reference characters will be used throughout the following description and in the drawing for identifying similar parts of the invention.

The nail 9 illustrated in Figure 1 is of a flat body having a tongue 10 at one end and a groove 11 at the opposite end. In the present case the grooved end of the nail is that which is driven into a corner construction first.

Along the sides of the nail 9 are flanges 12. For a distance forwardly of the tongue 10 the flanges 12 extend in parallelism. Further on, however, as the grooved end of the nail is approached the flanges 12 diverge causing a flared effect. A flare is given to the flanges 12 so that when the nail is driven into two pieces of material, one flange being driven into either piece, said pieces will be drawn closely together.

Usually the nails will be formed from a long strip of metal by a series of stamping and pressing operations so that when the tongue 10 is cut in one nail there will be a groove cut simultaneously in the opposite end of the succeeding nail.

In the nail 13 illustrated in Figures 3 and 4 there is a tongue 14 and a groove 15 at opposite ends. Along the sides of the nail 13 are flanges 16 not unlike the flanges 12 heretofore described in connection with the nail 9. In this case as above, the flanges 16 diverge as they approach the grooved end of the nail and for the reason hereinabove set forth.

Along the outer edges of the flanges 16 are ribs 17 conterminate with the flanges. It will be noted that the tongue 14 has at its base shoulders 18 offset inwardly of the flanges 16 so that the base of the tongue is narrower than the perpendicular distance between the flanges 16.

It is conceivable that the nail 9 may be constructed with the tongue 10 having shoulders similar to the shoulders 18 so that the base of said tongue will be of lesser breadth than the distance between the flanges 12. Also, the flanges 12 may have ribs thereon similar to the ribs 17 along the outer sides of the flanges 16.

When pieces of soft woods such as conifers are fabricated by nails of this type, the ribs 17 are useful for properly guiding the nail into the pieces. However, such a rib has a tendency to split a hard wood, hence it is desirable that the rib be eliminated from nails which are to be used for hard woods.

In Figure 5, the nail shown in Figure 1 is illustrated in assembly with two pieces 19 of wood forming a corner construction. Before being joined together the pieces 19 are mitered at 20 and kerfs 21 are cut within the mitered edges to serve as guides for the nail. After the two pieces 19 are placed with the faces 20 flatly together the nail 9 may be driven thereinto from the outer corner of the figure. As the nail 9 is driven into the construction, the flared portions of the flanges bite deeper into the kerfed sections to tightly draw the pieces 19 together. When it is finally lodged between the two pieces 19 the nail, which has been pre-chosen as to length, will aline the two edges of the groove 11 with the inner faces of the corner construction while the outer edges of the tongue 10 will be similarly alined with the outer edges of the corner construction. With the nail so set into the pieces 19 the kerfs 21 are entirely filled flushly with the edges of the pieces, thus making it unnecessary to use a filler such as putty or wax before a paint or varnish is applied to the structure.

Having thus described my invention, what is claimed as new and is desired to be secured by Letters Patent of the United States is:

1. A nail having a tongue at an end and a groove at the opposite end, there being flanges extending in substantial parallelism for a distance along opposite lateral edges of said nail and thereafter being flared as the grooved end of said nail is approached.

2. A flat nail having flanges at opposite lateral edges and arranged normally to the plane of said nail, there being a tongue at one end of said nail and a groove in the opposite end, said flanges extending in parallelism adjacent to the tongue bearing end of said nail and flaring as the grooved end of said nail is approached.

3. A flat nail having flanges along opposite edges and a tongue and a groove in opposite ends thereof, said flanges extending in parallelism near the tongue bearing end of said nail and being flared as the grooved end is approached, and the base of said tongue being narrower than the perpendicular distance between said flanges.

4. A flat nail having flanges along opposite edges, a tongue in one end and a groove in the opposite end thereof, said flanges being parallel for a distance from the tongue bearing end of said nail and being flared as the grooved end is approached, and the base of said tongue being coextensive with the perpendicular distance between said flanges.

5. A flat nail having flanges along its opposite edges, a tongue in one end and a groove in the opposite end thereof, there being a longitudinal rib in the outer sides of said flanges, the base of said tongue being less than the perpendicular distance between said flanges, and said flanges extending in parallelism for a distance from the tongue bearing end of said nail and thereafter being flared as the grooved end of said nail is approached.

6. A flat nail having flanges along its opposite edges, a tongue in one end and groove in the opposite end thereof, there being a longitudinal rib in the outer sides of said flanges, the base of said tongue being coextensive with the perpendicular distance between said flanges, and said flanges extending in parallelism for a distance from the tongue bearing end of said nail and thereafter being flared as the grooved end of said nail is approached.

ARTHUR CHRIS HEYSER.